United States Patent Office 3,178,430
Patented Apr. 13, 1965

3,178,430
CYCLONITE MANUFACTURE
Donald N. Thatcher, Pitman, N.J., assignor to E. I. du Pont de Nemours and Company, Wilmington, Del., a corporation of Delaware
No Drawing. Filed Feb. 20, 1963, Ser. No. 260,068
3 Claims. (Cl. 260—248)

This invention relates to a process for the preparation of cyclotrimethylenetrinitramine, a well-known explosive material.

Cyclotrimethylene trinitramine, more commonly and hereinafter referred to as cyclonite, usually is prepared by the nitrolysis of hexamethylenetetramine by means of concentrated nitric acid. This process, while having found wide commercial acceptance, is not without certain drawbacks stemming from the concurrent formation of homocyclonite (cyclotetramethylenetetranitramine), which may constitute up to about 10–12% of the product. As is known, homocyclonite exists in at least four polymorphic forms only one of which, i.e., the β-form, is sufficiently stable not to impair the impact stability of cyclonite significantly. The other forms, however, are four to seven times more sensitive to impact than the β-form, and their presence in cyclonite would lower the stability of the latter to a degree such as to have possible serious consequences. While crystallization conditions possibly may favor primarily the production of the β-form of homocyclonite, as long as this tetranitramine is produced there will always be the possibility that some of the more-sensitive forms will be produced. Obviously, the best safeguard against contamination of cyclonite with sensitive forms of homocyclonite would be to produce the cyclonite from materials which preclude the formation of homocyclonite in any form whatever.

I now have found that cyclonite can be prepared without the concurrent formation of homocyclonite by reacting a 1,3,5,-triacyl hexahydro-s-triazine with concentrated nitric acid. According to the process of this invention, a 1,3,5-triacyl hexahydro-s-triazine is treated with concentrated nitric acid, e.g., 80–100% nitric acid, at a temperature within the range of about 40° C. to the reflux temperature of the nitric acid, generally to about 85° C.

The triacyl s-triazine used as the starting material in the present process has the structural formula:

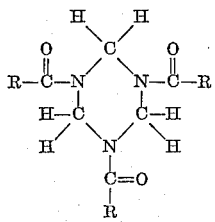

R can be H, alkyl, alkenyl, or aryl. For reasons of availability and economy, however, triazines which will be used most often will be those in which R is H or a lower-molecular-weight, e.g., a 1-3 carbon, alkyl or alkenyl radical. Preferred starting materials are, for example, 1,3,5-triacetyl-, 1,3,5-triapropionyl-, and 1,3,5-triacrylyl-hexahydro-s-triazines.

The nitric acid employed in the present process has a concentration of at least 80%, preferably 90–100%. Generally, operation under conditions as near as possible to anhydrous gives better yields of cyclonite. The ratio of the reactants by weight can vary widely. Generally, at least 10 parts by weight of nitric acid per part by weight of triazine will be used. As is shown in the following examples, ratios much higher than 10/1 may be employed, e.g., ratios higher than 70/1.

The reactants are contacted with each other, preferably with stirring, at a temperature of at least about 40° C., and preferably at least about 60° C. Temperatures as high as the reflux temperature of the nitric acid may be employed, i.e., temperatures up to about 85° C. The reactants should be in contact at reaction temperature for a period of at least five minutes to assure complete reaction. A preferred maximum period of contact at reaction temperature is about one hour, since with longer periods the product may begin to decompose.

The product is easily recoverable by cooling and pouring into water, the carboxylic acid by-product being soluble in water and the cyclonite precipitating out.

The following examples serve to illustrate specific embodiments of the present invention. However, they will be understood to be illustrative only and not as limiting the invention in any manner.

Example 1

One gram of 1,3,5-tripropionylhexahydro-s-triazine, prepared by the method described in Journal of the American Chemical Society, vol. 74, pages 5524-5 (1952), was added to 20 milliliters of 95% nitric acid at 25–27° C. over a period of four minutes, after which time the mixture was stirred at 70° C. for fifteen minutes. The mixture was then cooled and poured into 50 milliliters of ice water. The precipitate which formed was filtered off, washed with water, and dried to give 0.65 gram of cyclonite, M.P. 205–207° C. Infrared analysis indicated the absence of homocyclonite in the product.

Example 2

The reaction of 1,3,5-tripropionylhexahydro-s-triazine with nitric acid was effected under conditions different from those used in the experiment described in Example 1. The reaction conditions and results are given in the following table.

| Experiment No. | Amt. of Tripropionyl triazine (g.) | Amt. of HNO₃ (ml.) | Concn. of HNO₃ (percent) | Time Stirred (min.) | Temp. (° C.) Feed | Temp. (° C.) Stir | Amt. of cyclonite (g.) |
|---|---|---|---|---|---|---|---|
| 1 [1] | 5 | 50 | 95 | 30 | 40 | 70 | 1.7 |
| 2 [2] | 5 | 75 | 95 | 20 | 40 | 70 | 2.3 |
| 3 [2] | 5 | 125 | 95 | 30 | 40 | 70 | 1.8 |
| 4 | 5 | 125 | 95 | 60 | 24-31 | 70 | 1.0 |
| 5 [2] | 5 | 50 | 95 | 35 | 40 | 70 | 2.3 |
| 6 [3] | 5 | 100 | 98 | 45 | 25 | 25;70 | 2.5 |
| 7 | 5 | 100 | 98 | 15 | 40 | 70 | 2.15 |
| 8 | 5 | 100 | 98 | 5 | 40 | 70 | 2.15 |

[1] 1 g. urea and 1.5 g. sulfamic acid added to tie up any HNO₂ in the HNO₃.
[2] 1.5 g. sulfamic acid added.
[3] Stirred 30 min. at 25° C. and 15 min. at 70° C.

*Example 3*

Five grams of 1,3,5-triacetylhexahydro-s-triazine was added to 100 milliliters of 98% nitric acid at 25° C. The mixture was stirred at 25° C. for 30 minutes, and at 70° C. for 60 minutes. Then the mixture was cooled and poured into ice water. The precipitate which formed was filtered off, washed with water, and dried to give 1.6 grams of cyclonite.

I claim:

1. A process for preparing cyclonite which comprises reacting a triacyl hexahydro-s-triazine of the structural formula:

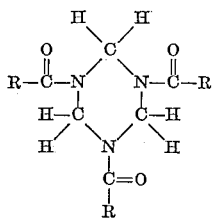

wherein R is selected from the group consisting of hydrogen, lower alkyl and lower alkenyl with 80 to 100 percent nitric acid at a temperature within the range of from about 40° C. to 85° C.

2. A process according to claim 1, wherein said triacyl s-triazine is 1,3,5-tripropionylhexahydro-s-triazine.

3. A process according to claim 1, wherein said triacyl s-triazine is 1,3,5-triacetylhexahydro-s-triazine.

References Cited by the Examiner

Smolin et al.: "s-Triazines and Derivatives," pages 518 to 521, 533 to 535 and 567 to 568, Interscience Publishers, Inc., New York (1959).

IRVING MARCUS, *Primary Examiner.*

JOHN D. RANDOLPH, *Examiner.*